United States Patent [19]

Watanabe et al.

[11] Patent Number: 5,644,407
[45] Date of Patent: Jul. 1, 1997

[54] IMAGE PROCESSING APPARATUS HAVING A REMOTE COMMUNICATION FUNCTION

[75] Inventors: Asao Watanabe, Higashi Kurume; Yukihiko Ogata, Kawasaki; Hiroyuki Nakanishi, Yokohama; Seijiro Yanase, Machida; Koji Harada, Fuchu, all of Japan

[73] Assignee: Canon Kabushiki Kaisha, Tokyo, Japan

[21] Appl. No.: 811,054

[22] Filed: Dec. 20, 1991

[30] Foreign Application Priority Data

| Dec. 20, 1990 | [JP] | Japan | 2-404036 |
| Dec. 20, 1990 | [JP] | Japan | 2-404287 |
| Dec. 20, 1990 | [JP] | Japan | 2-404288 |
| Dec. 20, 1990 | [JP] | Japan | 2-404289 |

[51] Int. Cl.$^6$ .................. G02B 27/02; G02B 23/08; G03B 21/60
[52] U.S. Cl. .................. 358/434; 358/402; 358/403; 358/444; 358/456
[58] Field of Search .................. 358/400, 401, 358/403, 434, 438, 468, 444, 456, 448, 402; 379/100; 348/468; 395/162, 164, 158; H04N 1/34, 1/44

[56] References Cited

U.S. PATENT DOCUMENTS

| 3,914,771 | 10/1975 | Lunde et al. | 346/74 ES |
| 4,388,645 | 6/1983 | Cox | 348/468 |
| 4,588,990 | 5/1986 | Tamura | 340/792 |
| 4,641,133 | 2/1987 | Ono | 358/400 |
| 4,994,926 | 2/1991 | Gordon | 358/400 |
| 5,001,744 | 3/1991 | Nishino | 379/9 |
| 5,072,310 | 12/1991 | Yamamoto et al. | 358/401 |
| 5,194,967 | 3/1993 | Nonomura | 358/434 |

FOREIGN PATENT DOCUMENTS

| 0318583 | 12/1988 | Japan . | |
| 0292976 | 11/1990 | Japan | H04N 1/44 |

*Primary Examiner*—Sandra L. O'Shea
*Assistant Examiner*—John Ning
*Attorney, Agent, or Firm*—Fitzpatrick, Cella, Harper & Scinto

[57] ABSTRACT

An image display control method for controlling an image display unit having a first memory for storing a plurality of images from a remote location through a predetermined line includes the steps of receiving first data for indicating an image to be displayed and second data indicating a time to display the image indicated by the first data through the predetermined line, and storing the received first data and second data in a second memory. In addition, the image indicated by the first data from the first memory is read when the time indicated by the stored second data is reached and the image on the image display unit is displayed.

30 Claims, 16 Drawing Sheets

FIG.13

1301 — DISPLAY TIME 10:00:00 — DISPLAY PERIOD ONE MINUTE

1302 — DISPLAY TIME 10:00:01 — DISPLAY PERIOD ONE MINUTE

1303 — DISPLAY TIME 10:00:02 — DISPLAY PERIOD ONE MINUTE

1304 — DISPLAY TIME 10:00:03 — DISPLAY PERIOD ONE MINUTE

1305 — DISPLAY TIME 10:00:04 — DISPLAY PERIOD ONE MINUTE

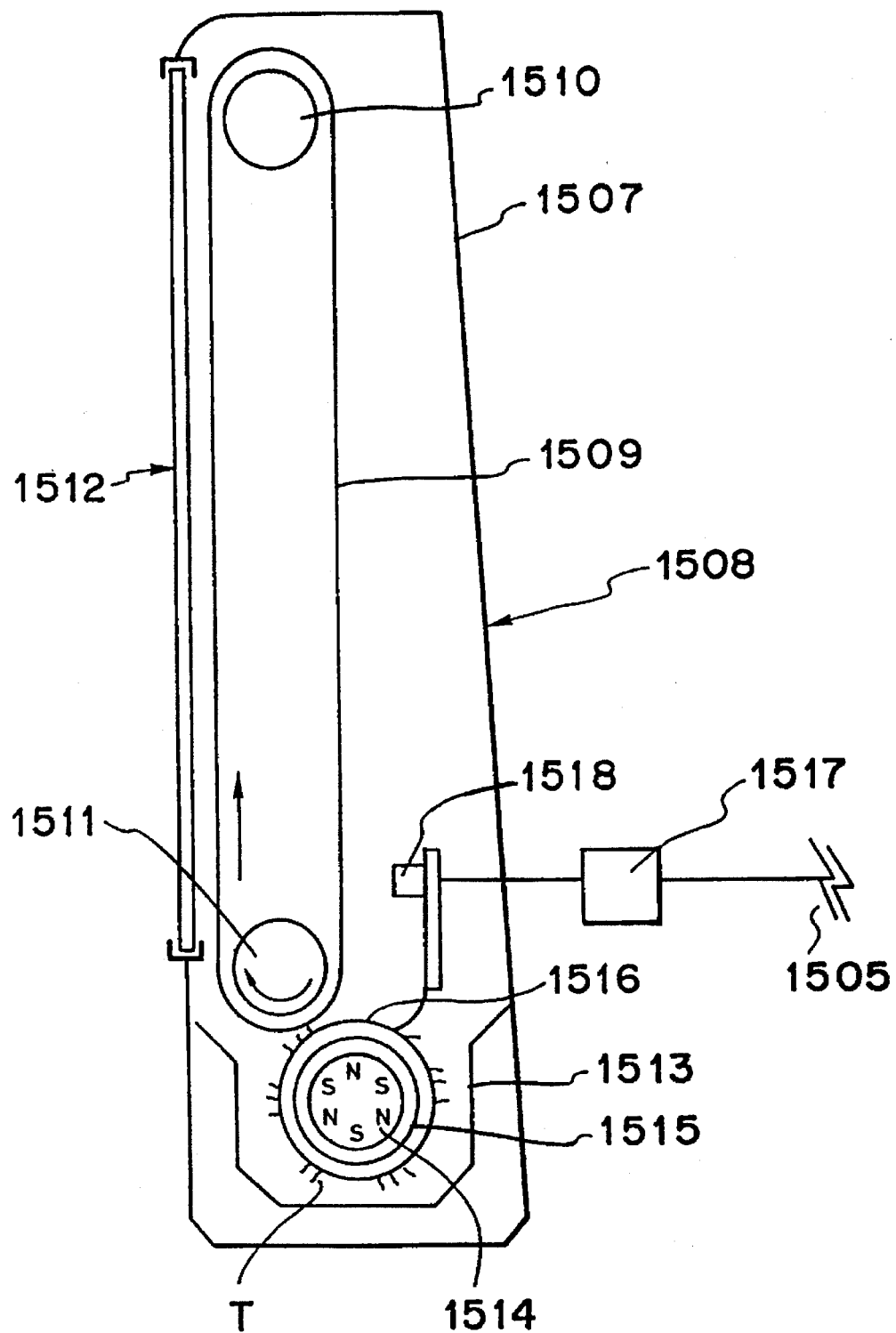

IMAGE PROCESSING APPARATUS HAVING A REMOTE COMMUNICATION FUNCTION

BACKGROUND OF THE INVENTION

1. Field of the Invention

The present invention relates to an image processing apparatus having a communication function.

2. Related Background Art

A large size display apparatus with a communication function has been known by U.S. patent application Ser. Nos. 07/996,880, filed Dec. 12, 1992 and 07/960,288 filed Oct. 13, 1992. The display apparatus with the communication function displays information such as images, characters and graphics to many non-specified people at a public place such as station, airport or event place. It receives image data to be displayed through a communication line and displays it on a display screen.

A prior art display apparatus with a communication function uses a so-called magne-stylus recording system as shown in FIG. 17.

In FIG. 17, image display means 1508 having the following units is provided in an apparatus main unit 1507.

Numeral 1509 denotes a display belt which forms a display screen, and it comprises an endless belt-like member having a white surface. It is spanned over a pair of vertically arranged rollers 1510 and 1511 for driving it and supported planarly to a display unit 1512. Numeral 1513 denotes image forming means for forming an image to be displayed on the display belt. The image is formed by electro-statically depositing conductive magnetic toner T to the display belt 1509 by a method disclosed in Japanese Patent Publication No. 51-46707.

The magnetic toner T is carried on a non-magnetic cylinder 1515 by the station of a rotary magnet 1514 and supplied to a recording electrode 1516. A signal sent to the record electrode 1516 through a line 1505 is converted to a display image signal by a receiving unit 1517 and a voltage determined by the display image signal is applied by a driver 1518 to the display belt 1509 so that the magnetic toner T is deposited on the display belt 1509 to form a desired image. The belt 1509 is rotated and displayed on the display unit 1512.

A control unit and a communication unit are configured as shown in FIG. 16.

The receiving unit 1517 comprises a receiver 1504 for interfacing with a communication line 1505 such as a telephone line, a control unit 1501 including a microprocessor and a memory, and a screen display unit 1503 including the display mechanism of FIG. 17 and a driver therefor.

An operation to display the image data received from the communication line is explained with reference to FIG. 15.

The control unit 1501 receives the image signal sent from the line 1505 by the receiver 1506 (step S1501) and receives the image information by the receiver 1506 and transfers them to the screen display unit 1503 (step S1502).

However, the prior art apparatus merely displays the image sent from a terminal device such as a facsimile device and has the following short-comings.

(1) The control to the display is limited to preset control and the control method cannot be altered from a distant place.

(2) Since there is no output means in the display apparatus, it is not possible to inform the switching of the displayed image at the switching time of the display by a voice output.

(3) When a new image is received, the previously stored image is erased. In order to sequentially switch the display, it is necessary to transfer the image data each time but high speed display switching is not possible.

(4) A plurality of apparatus may be provided and used, but because of a lack of means for remotely synchronizing timers of the respective apparatus, it is not possible to synchronize the displays of the plurality of apparatus by the timer control. Further, the timers must be adjusted at the installation places of the apparatus.

(5) In a multi-station transmission mode, the control command and the image data must be sequentially sent to each of the image display apparatus. This is time consuming.

A remote control method to a facsimile device at a distant place includes a method which uses a DTMF signal (tone signal) or a V21 modem signal.

In the prior art apparatus, however, when the facsimile device at a distant place is to be remotely controlled, command/response communication can be made only by one predetermined control signal such as DTMF signal (tone signal) or V21 modem signal.

When the DTMF signal is used, for example, proper communication may not be attained if the line status is not good or an affect by an echo is included such as in an overseas line.

The DTMF signal is basically sent by a telephone set and the V21 modem signal is sent by a modem which conforms to the V Series Recommendation. Namely, a terminal which remotely controls the apparatus is determined by the signal type. Thus, if an appropriate terminal is not available, the remote control is not attained. In case of the V21 modem signal, a personal computer is required even for a simple control and hence the operation is complex.

The above problems are not limited to the facsimile device but common to various communication apparatus.

SUMMARY OF THE INVENTION

It is an object of the present invention to provide an image processing apparatus which eliminates the above defects.

It is another object of the present invention to provide an image processing apparatus which permits remote designation of timing of image display and remote designation of sequence of display to enhance the remote control.

It is another object of the present invention to provide an image processing apparatus which can control a remote display unit not by a terminal but by command of plural signal formats.

It is another object of the present invention to provide an image processing apparatus which can remotely and temporarily display other images during display of one image by interruption.

It is another object of the present invention to provide an image processing apparatus which synchronizes a plurality of remote display units to precisely display images by the plurality of display devices.

Other objects of the present invention will be apparent from the following detailed description and claims and the accompanying drawings.

BRIEF DESCRIPTION OF THE DRAWINGS

FIG. 13 shows displays by a plurality of display units, FIG. 17 shows a block diagram of a display mechanism of the prior art apparatus.

DETAILED DESCRIPTION OF PREFERRED EMBODIMENTS

Figure 1:
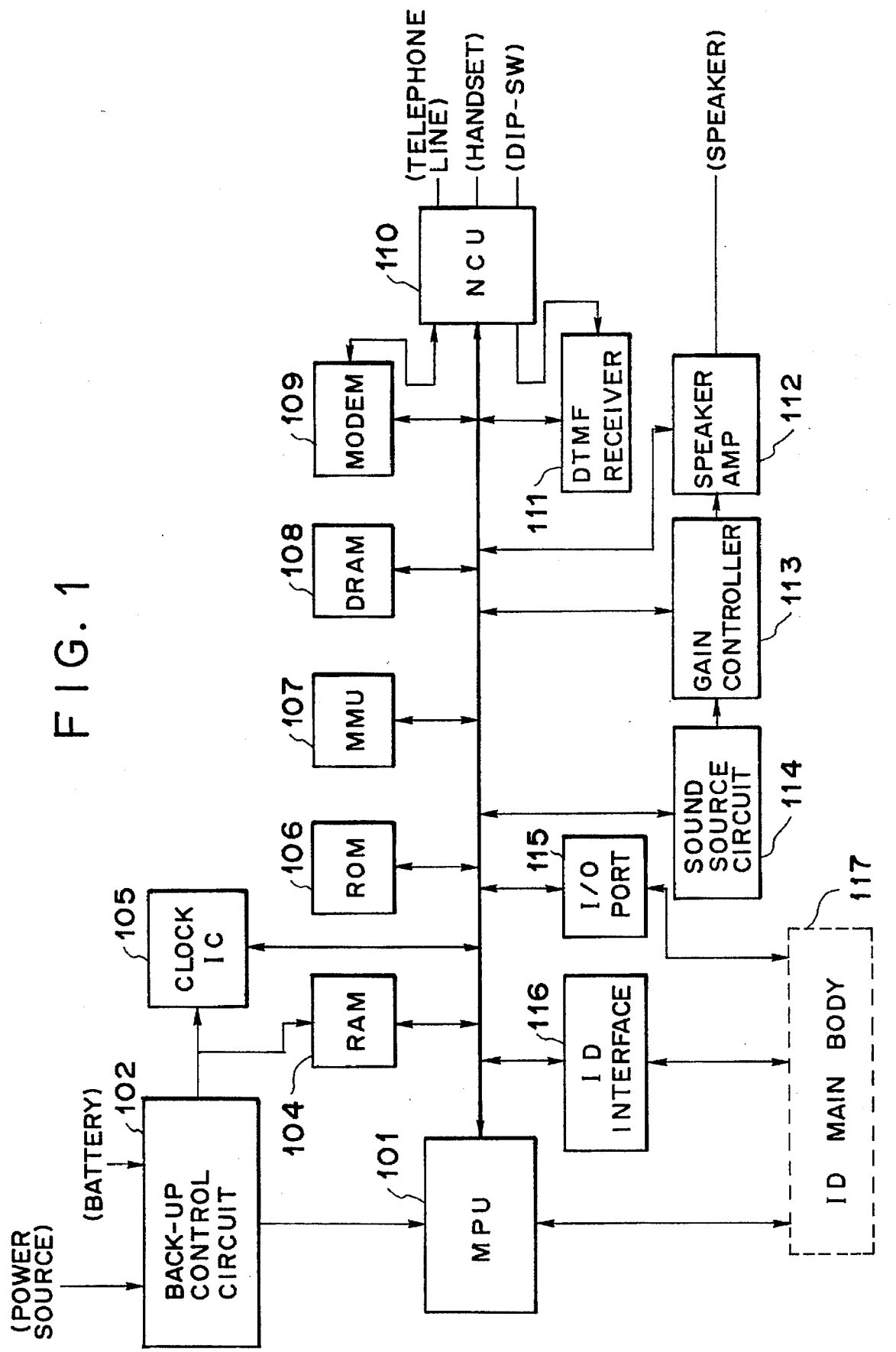
FIG. 1 shows a block diagram of an image processing apparatus of the present invention.

The present invention is now explained in detail with reference to the embodiments shown in the drawings. A display unit with a communication function (ID-FAX) is discussed below as an example of the image processing apparatus.

FIG. 1 shows a configuration of the display unit with the communication function in accordance with the image processing apparatus of the present invention. The display unit with the communication function of the present embodiment is used to display information such as image, characters and graphics to many non-specified people at a public place such as station, airport or event place as is the prior art apparatus.

In FIG. 1, numeral 117 denotes a display unit (ID unit) having a display mechanism by a magne-stylus system. It erasably displays a received image on a screen. The display mechanism may be of the same configuration as that of the prior art shown in FIG. 17.

The ID unit is connected to a bus of an MPU 101 through an ID interface 116 and an I/O port 115.

The MPU 101 comprises a microprocessor and controls the entire unit in accordance with a program to be explained later and stored in a ROM 106. The MPU 101 uses a RAM 104 as a work area.

The present unit uses a telephone line as a communication line, and has a modem 9, an NCU 110 and a DTMF receiver 111 as a line interface.

The NCU 110 controls a subscriber line. A hand set and a DIP switch are connected to the NCU 110 so that it may set various parameters by a DTMF signal from the hand set.

A modem 109 analyzes a V21 modem signal received from a personal computer through the subscriber line, and a DTMF receiver 111 analyzes the DTMF signal from the telephone line or the hand set.

A command received from the subscriber line is analyzed by the modem 109 or the DTMF receiver 111 and it is supplied to a bus. The MPU 101 processes the analyzed command to control the I/O to effect image control, display control and operation control.

A sound source circuit 114, a gain controller 113 and a speaker amplifier 112 are connected to the bus of the MPU 101 to drive a speaker. A voice signal outputted therefrom is speech-synthesized or modulated by the sound source circuit 114 under the control of the MPU 101 in accordance with data received in a predetermined signal format through the NCU 110 and the modem 109.

In the present embodiment, the image data is received through the NCU 110 and the modem 109, decoded by the MPU 101 or decode means (not shown), and stored in a DRAM 108 under the control of the MMU 107.

A clock IC 105 controls the time and produces time data. It is used to display an image at a designated time, or where a plurality of ID-FAX's are used, it is used to synchronize a plurality of display units.

A back-up control circuit 112 is connected to a plurality of power supplies such as a line source and a battery source. Normally, the line source is used to power the MPU 101, the RAM 104 and the clock IC 105 (or other devices), and when the line source fails, the back-up control circuit 112 switches the supply to the battery.

Figure 2:
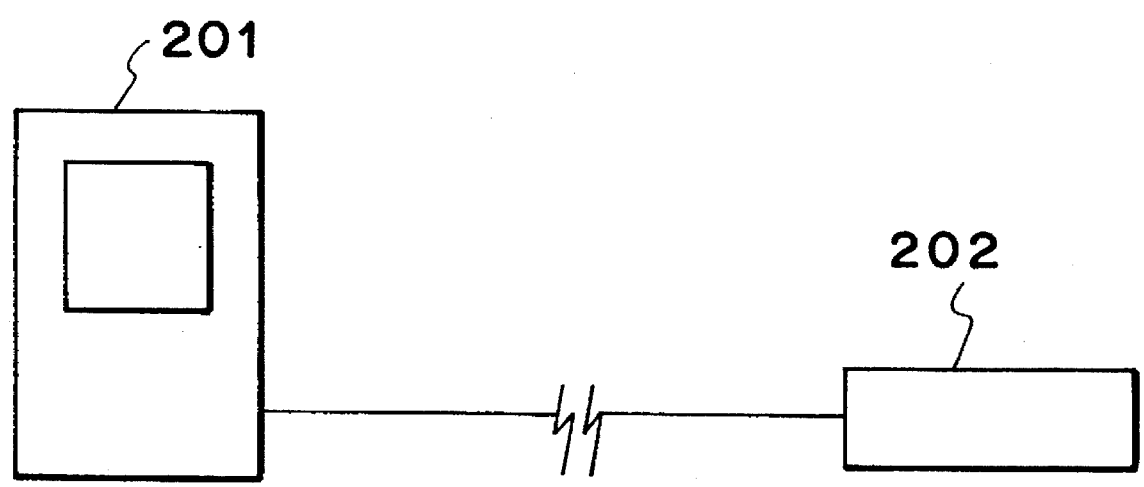
FIG. 2 shows a connection between a display unit and a remote terminal such as a facsimile device.

FIG. 2 shows a basic connection between an ID-FAX and a remote terminal such as a facsimile device to control the ID-FAX. Numeral 201 denotes an image display unit and numeral 202 denotes a remote terminal such as a facsimile device.

Figure 3:
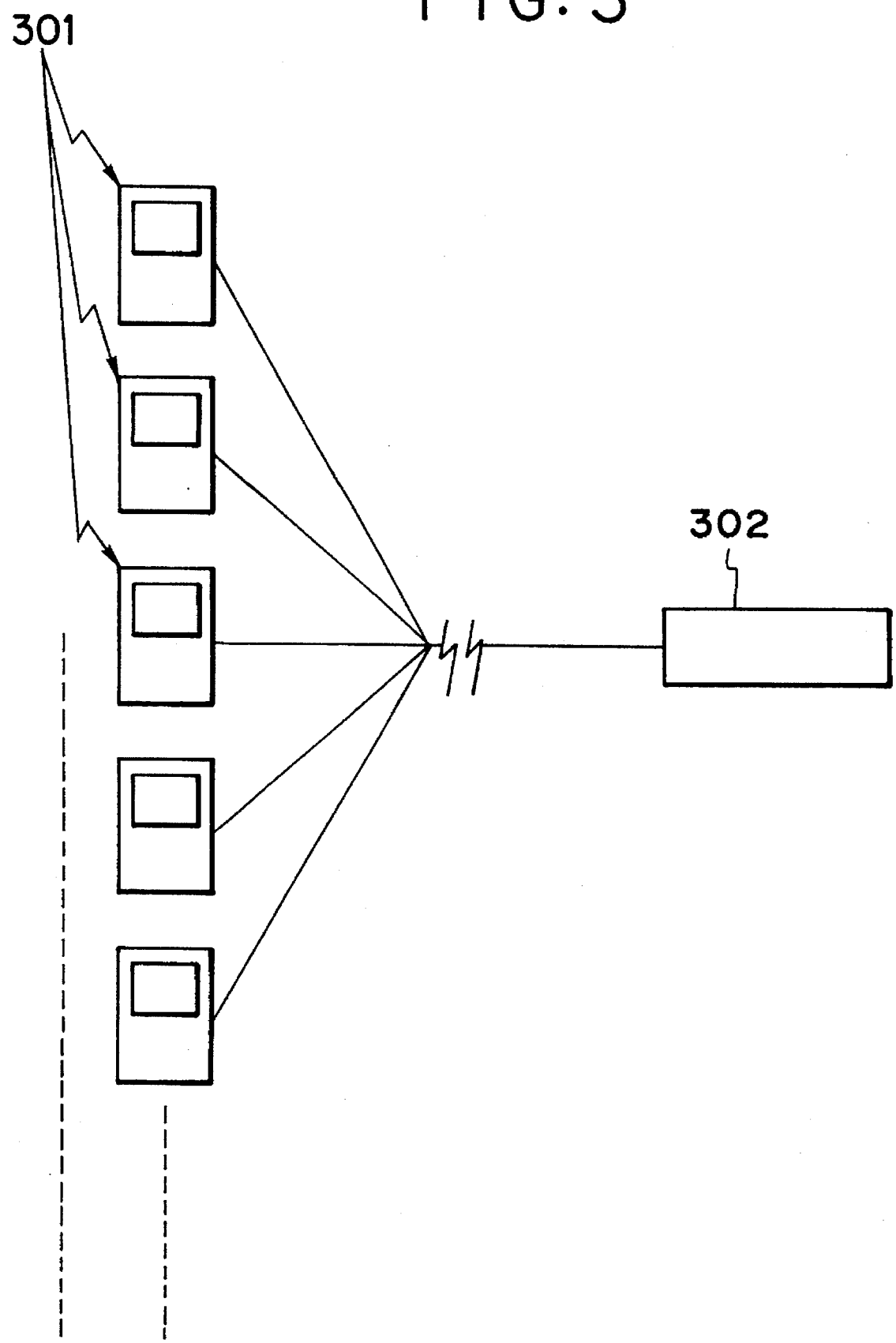
FIG. 3 shows a connection between a plurality of display units and a remote terminal such as a facsimile device.

FIG. 3 shows a connection when a plurality of ID-FAX's 301 are controlled by a terminal 302 such as a facsimile device.

Figure 4:
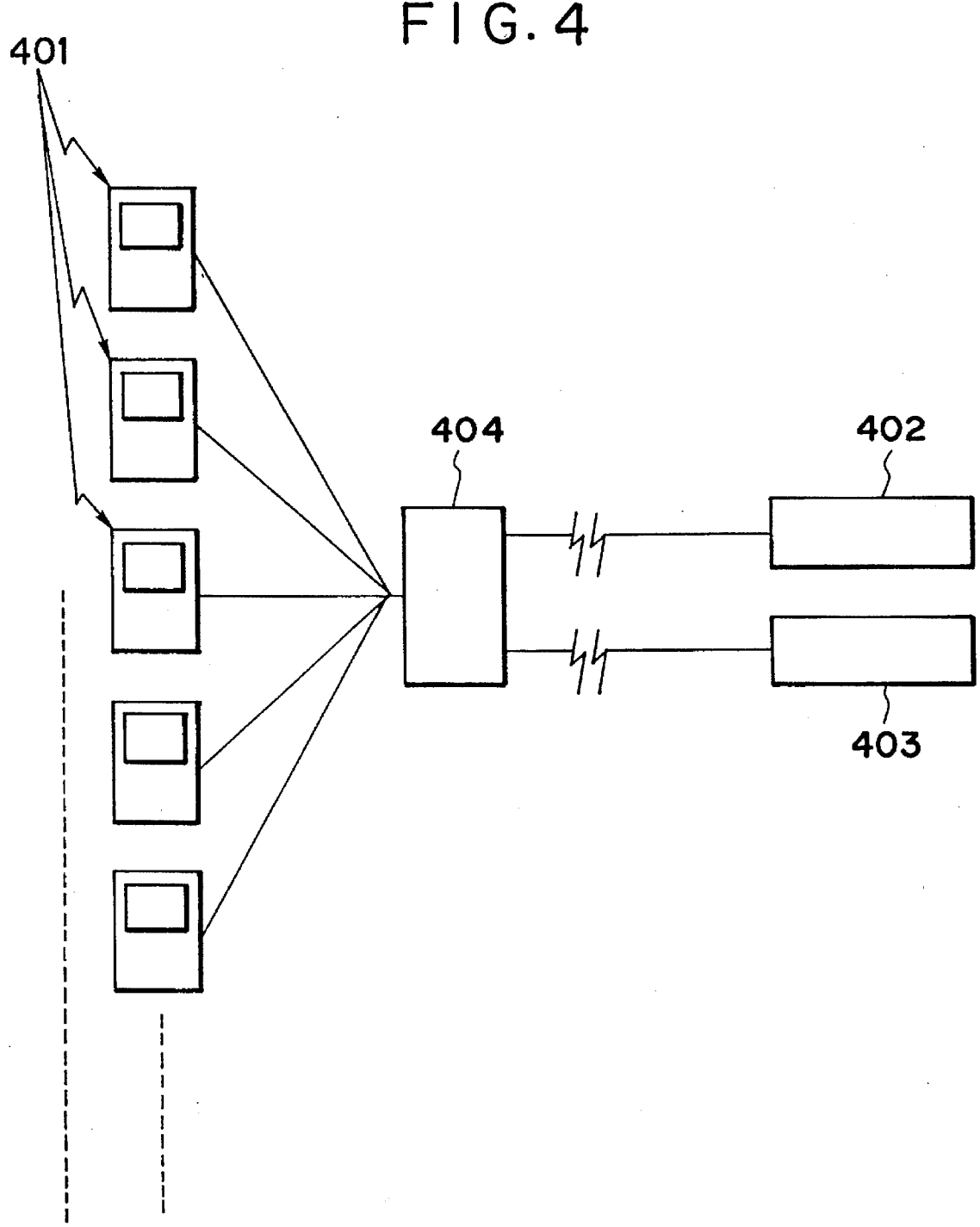
FIG. 4 shows a connection between a display unit and a remote terminal such as a facsimile device through a multi-station transmission device.

FIG. 4 shows a connection between a plurality of ID-FAX's 401 and a plurality of terminals 402 and 403 such as facsimile devices. A multi-station transmission unit 404 may be inserted between the display units 401 and the terminals 402 and 403 such as facsimile devices, as shown in FIG. 4. The multi-station transmission unit 404 simultaneously transmits image information to a plurality of ID-FAX's in response to a multi-station transmission command from the facsimile terminal.

The image to be displayed is transferred from the terminal such as a facsimile device to the ID-FAX by an appropriate protocol such as a facsimile protocol.

Not only the image data but also the display control program are transmitted, and after the disconnection of the line, the previously transmitted images are selectively displayed in a predetermined sequence. In this manner, an off-line control is attained.

Voice output may be produced in synchronism with the switching of display by blocks 112–114 shown in FIG. 1.

The times of the clock IC's 105 of the plurality of ID-FAX's can be set by sending a predetermined command from the facsimile terminal.

When a plurality of ID-FAX's are used in parallel, the displays thereby can be synchronized by a control sequence to be described later. For example, an animation (to be described later) shown in FIG. 13 is attained.

A control sequence to attain the above operations is now explained with reference to FIGS. 5 to 12. FIGS. 5 to 11 show control flow charts of the ID-FAX, and FIG. 12 shows a control sequence for animation of the remote terminal such as a facsimile device.

In the following description, it is assumed that the remote terminal such as a facsimile device sends various control commands which may be a DTMF signal, a facsimile protocol signal or any modem signal defined by the CCITT Recommendation 30.

The display image data is stored in the DRAM 108 and the parameter data for controlling the display is stored in the RAM 104.

Figure 5:
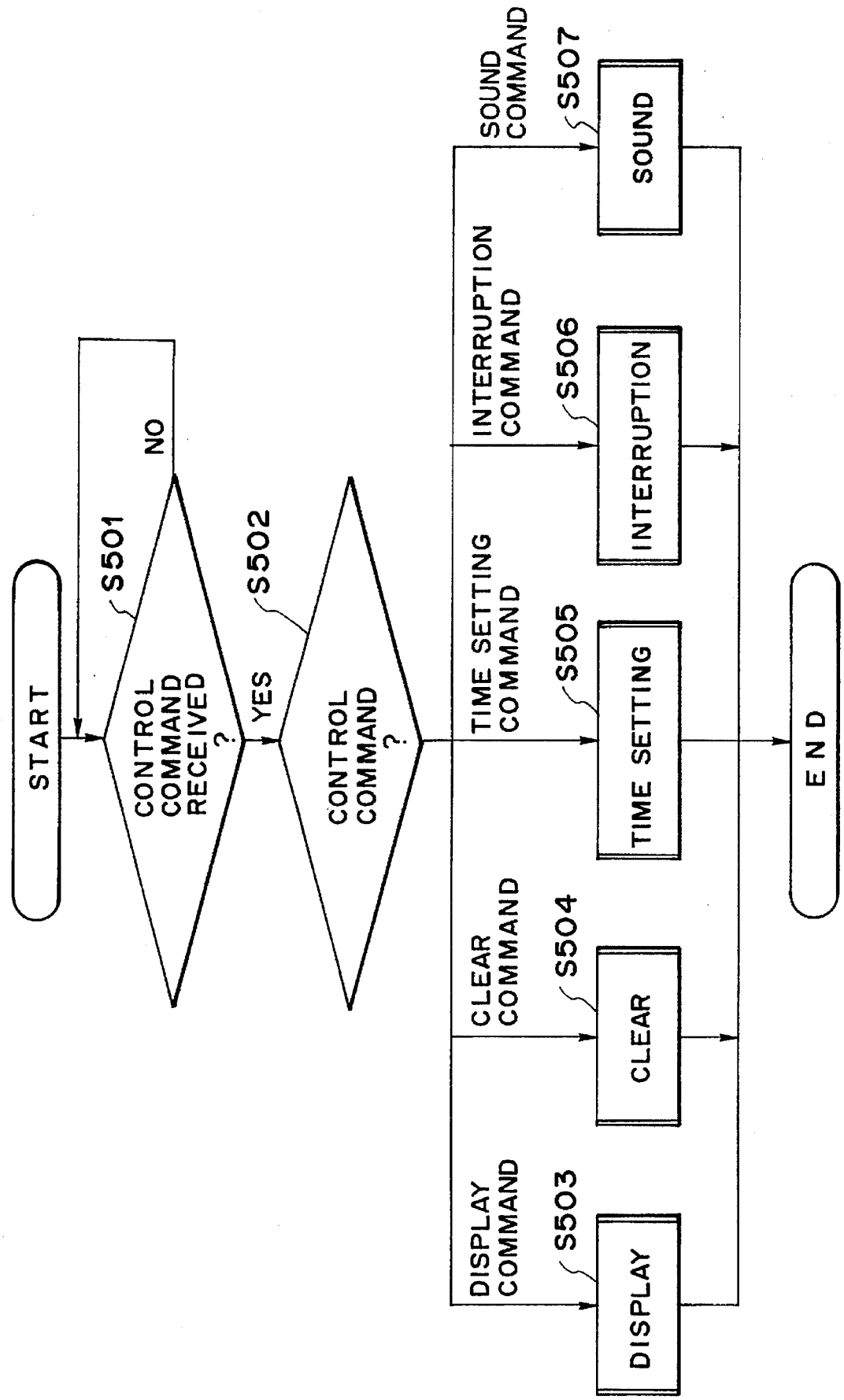
FIG. 5 shows a flow chart of a basic display control sequence of the display unit.

FIG. 5 shows a basic control when a control command is received from the ID-FAX.

As shown, when the control command is received (step S501), the content of the control command is checked (step S502). If it is a display command, the process proceeds to a display sub-routine (step S503), if it is a clear command, the process proceeds to a clear sub-routine (step S504), if it is a time set command, the process proceeds to a time set sub-routine (step S505), if it is an interruption command, the process proceeds to an interruption sub-routine (step S506), and if it is a voice control command, the process proceeds to a voice control sub-routine (voice sub-routine) (step S507), to execute the corresponding process.

Figure 6:
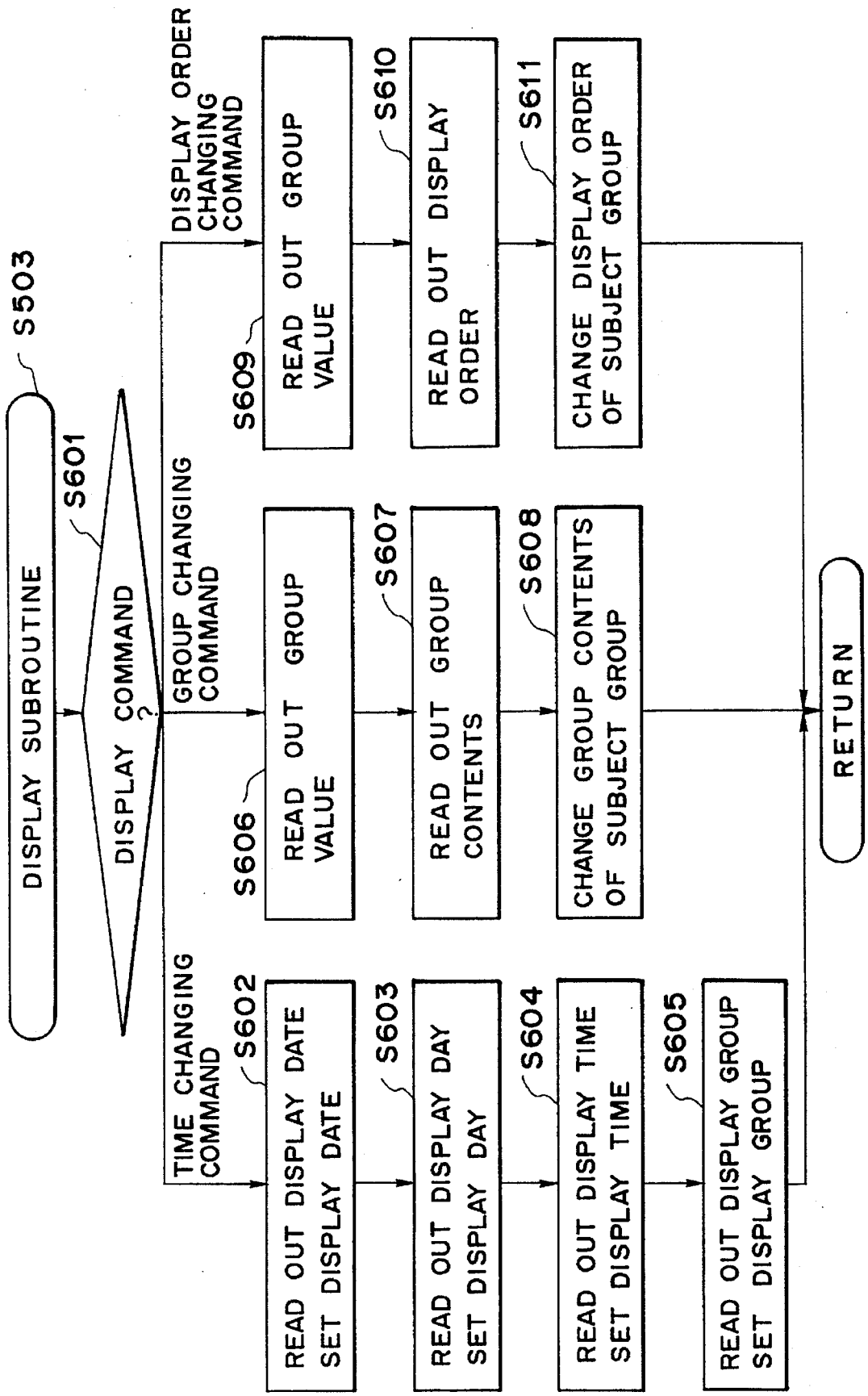
FIG. 6 shows a flow chart of a control command analysis sequence of the display unit.

The display sub-routine is shown in FIG. 6.

It is assumed that there are at least three command sub-categories, a time change command, a group change command and a display sequence change command.

The display image is controlled for the display (switching) time for each data unit called a display group. The display group comprises at least one page or several pages of image data. The image of the group may be edited page by page. (See, for example, erase process of FIG. 7.)

Of the three commands mentioned above, the time change command sets a display group to be displayed at a specific time. The display group change command replaces the image data of one group. The display sequence change command changes the display sequence of the image data in one display group.

In the process of FIG. 6, the type of the display command is checked (step S601). If it is the time set command, the process proceeds to a step S602, if it is the group change command, the process proceeds to a step S606, and if it is the display sequence change command, the process proceeds to a step S609.

In the step S602, data indicating the display data sent from the facsimile terminal is read to update the setting in the RAM 104, data indicating the display day of the week is read to update the setting in the RAM 104 (step S103), data indicating the display time is read to update the setting in the RAM 104 (step S604), and data indicating the display group is read to update the setting in the RAM 104 (step S605).

In this manner, settings are made to display the image of a desired display group at a desired time. When the time data produced by the clock IC 105 coincides with the time set in the RAM 104, the MPU 101 reads the image of the display group preset in the RAM 104 from the DRAM 108 and displays them by the ID unit in the preset sequence.

If the display command is the group change command, the transmitted group number is read (step S606), the transmitted group content is read (step S607) and the group content of the corresponding group in the RAM 104 is updated (step S608).

In this manner, the content of the image data of the designated display group is changed.

If the display command in the display sequence change command, the transmitted group number is read (step S609), the transmitted data indicating the display sequence is read (step S610) and the data indicating the display sequence of the corresponding group in the RAM 104 is updated (step S611).

In this manner, the display sequence of the image data in one display group is changed.

Figure 7:
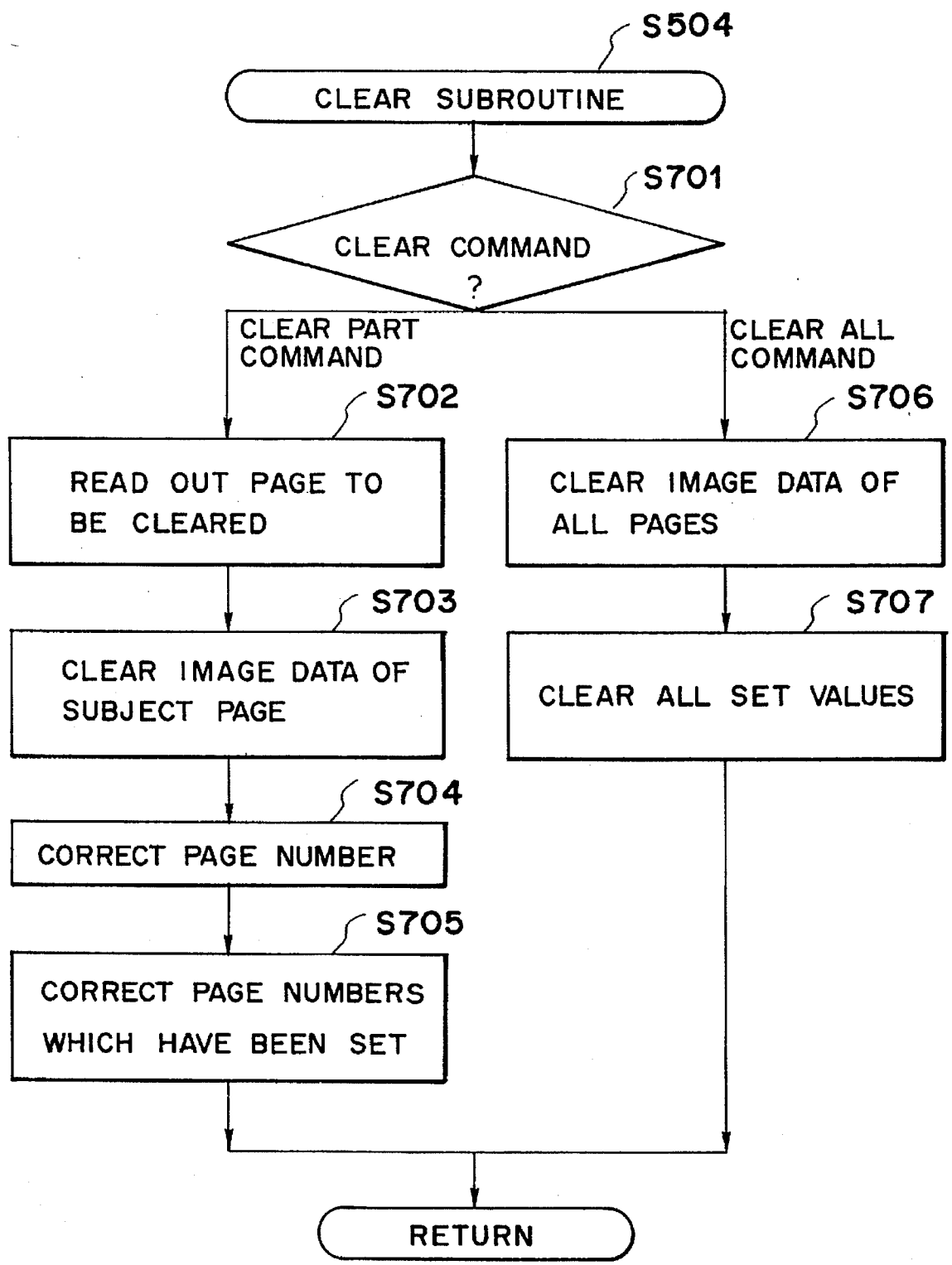
FIG. 7 shows a flow chart of an image clear sequence of the display unit.

On the other hand, the clear sub-routine of FIG. 5 is configured as shown in FIG. 7.

The type of clear command is checked (step S701). If it is a partial clear command, the transmitted data indicating the image page to be cleared is read (step S702), the image data of the corresponding page is erased from the DRAM 108 (step S703), the page numbers are renumbered in sequence from page 1 (step S704), and the page numbers in the settings stored in the RAM 104 by the display command are updated by the corrected page numbers (step S705). By renumbering the page numbers, the matching between the image data associated by the page number in one display group and the actual image data is secured.

If the clear command is a total clear command, all pages of image data is erased from the DRAM 108 (step S706) and all settings relating to the image display stored in the RAM 104 by the display command are erased (step S707).

Figure 8:
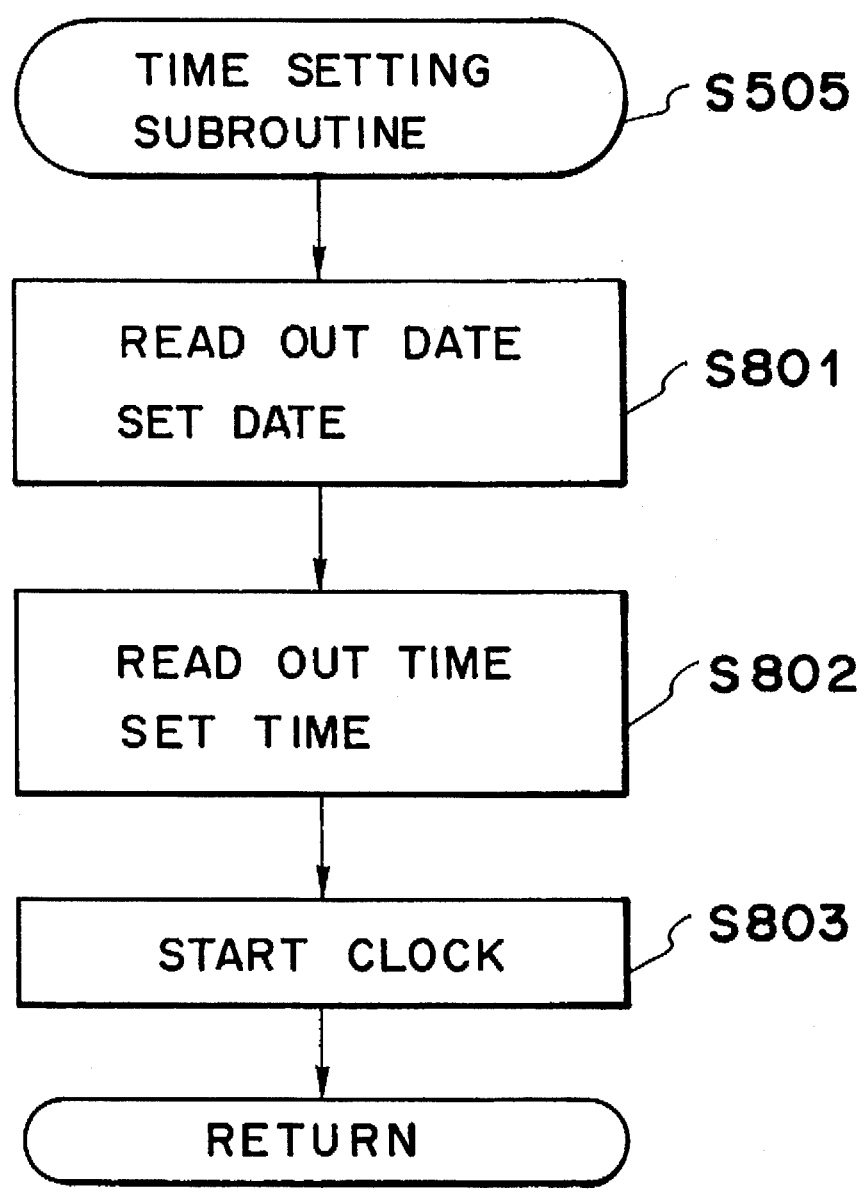
FIG. 8 shows a flow chart of a time setting sequence of the display unit.

On the other hand, in the time set sub-routine of FIG. 1, a process shown in FIG. 8 is executed. The transmitted date data is read and stored in the RAM 104 (step S801). The transmitted time data is read and stored in the RAM 104 (step S802). The clock IC 105 is started (step S803). Where a plurality of ID-FAX's are used, the transmission/reception of the time set control command is executed at a speed to permit the synchronized start of the clock IC's 105 of the plurality of ID-FAX's within a predetermined error time.

Figure 9:
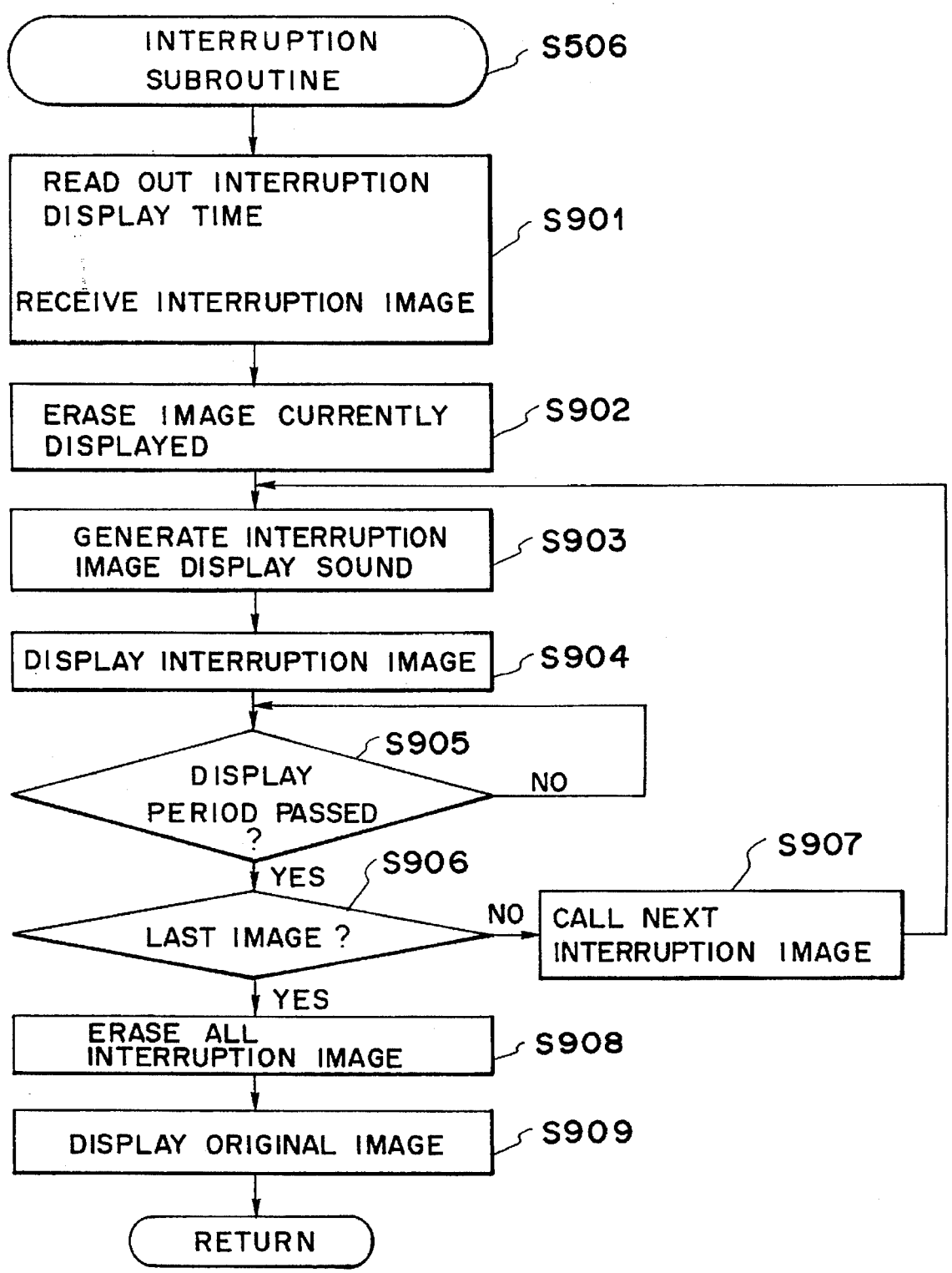
FIG. 9 shows a flow chart of an interruption display sequence of the display unit.

In the interruption sub-routine of FIG. 1, a process shown in FIG. 9 is executed so that image information of an urgent message interrupts a predetermined sequence of display.

In FIG. 9, the data indicating the display time of the interruption image transmitted from the terminal is read and the transmitted interruption image is received (step S901), the currently displayed image is erased from the display unit 1512 by rotating the belt 1509 (see FIG. 16) (step S902), sound to inform the display of the interruption image is generated by the sound source circuit 114 (step S903), and the interruption image is displayed (step S904). The interruption image is displayed until the display time designated by the terminal elapses (step S905), and if there is another interruption image (step S906), the next interruption image is read from the DRAM 108 (step S907) and the process repeates the steps S903 to S905. Those steps are repeated until the last interruption image is displayed (step S906), when all interruption images are erased from the DRAM 108 (step S908) and the image prior to the display of the interruption image is read from the DRAM 108 to return to the original state (step S909).

In this manner, the interruption image is displayed and the notice is brought by sound.

Figure 16:
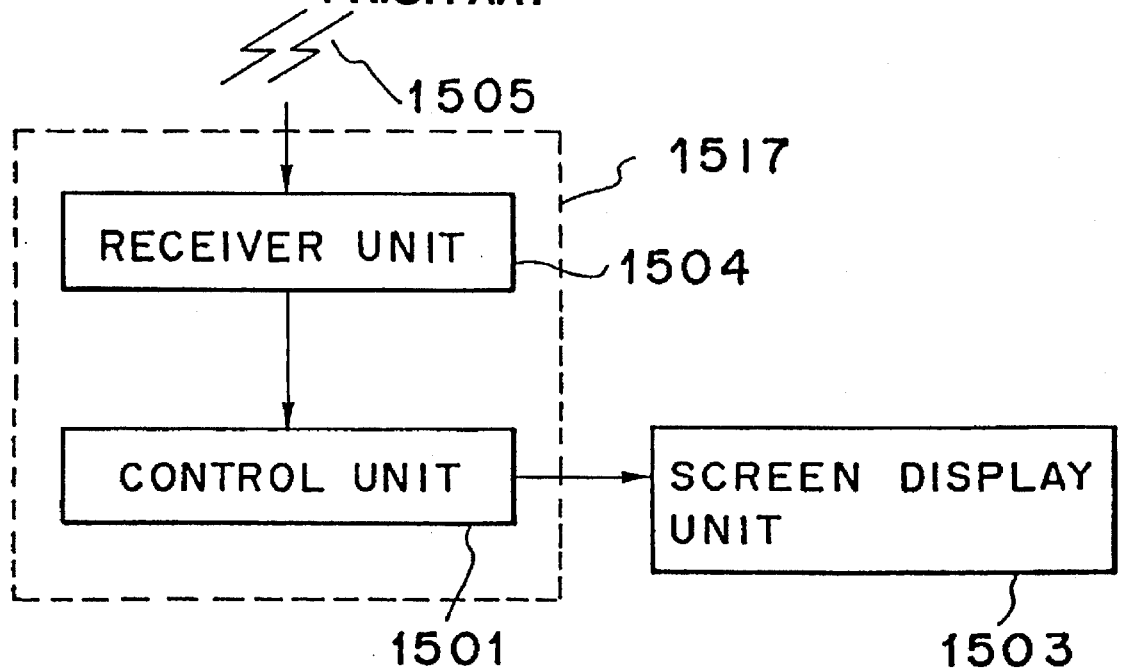
FIG. 16 shows a block diagram of a control unit of the prior art apparatus.

In the present embodiment, the sound is generated after the erasure, and then the interruption image is displayed. When the display mechanism shown in FIG. 16 is used, an old image is moved to a rear side of the belt 1509 when a new image is displayed. Accordingly, no separate erase operation is required and the interruption image may be displayed immediately after the generation of the sound.

Figure 10:
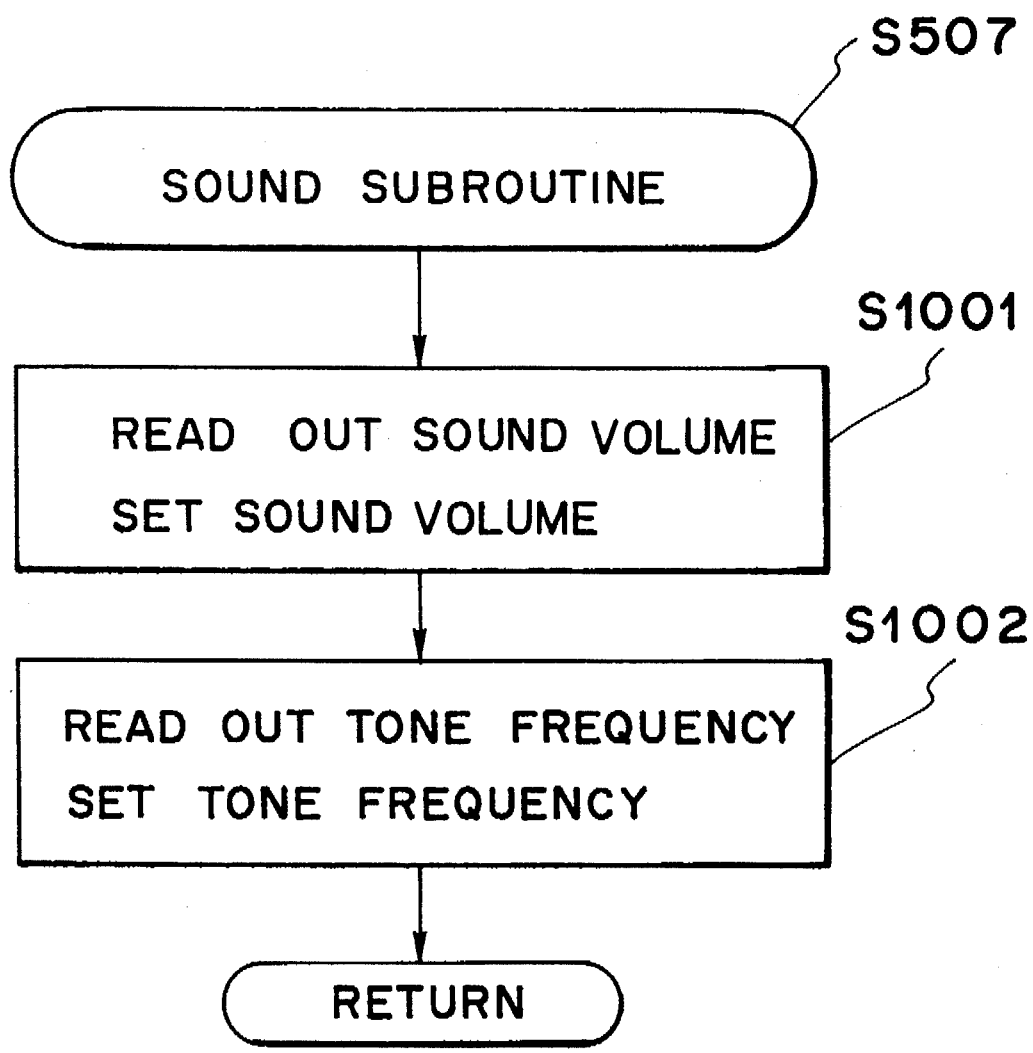
FIG. 10 shows a flow chart of a voice control sequence of the display unit.

The sound sub-routine of FIG. 5 executes a process shown in FIG. 10.

The data indicating the sound volume transmitted from the terminal is read and stored in the RAM 104 (step S1001), and the transmitted data indicating the tone frequency is read and stored in the RAM 104 (step S1002). Not only the sound volume and the frequency but also the modulation system may be set. Speech synthesization may be done by similar command control.

The ID-FAX accepts various display control commands in FIG. 5 as well as a polling command. Thus, the remote terminal can cause the transmission of the image data stored in the DRAM 108 of the ID-FAX and the status data on the operation status for each page, as required, and check them.

Figure 11:
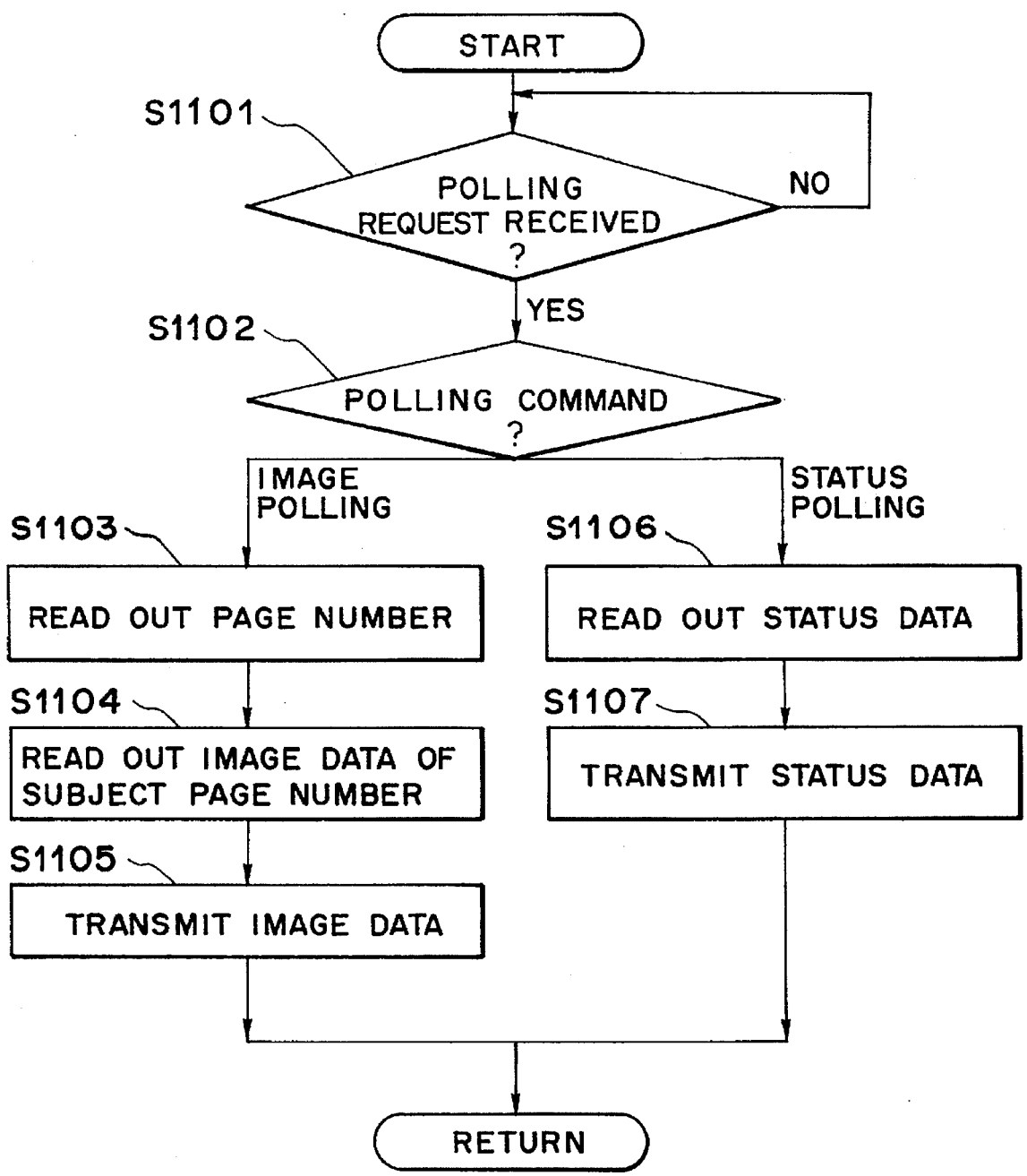
FIG. 11 shows a flow chart of a polling transmission sequence of the display unit.
Figure 12:
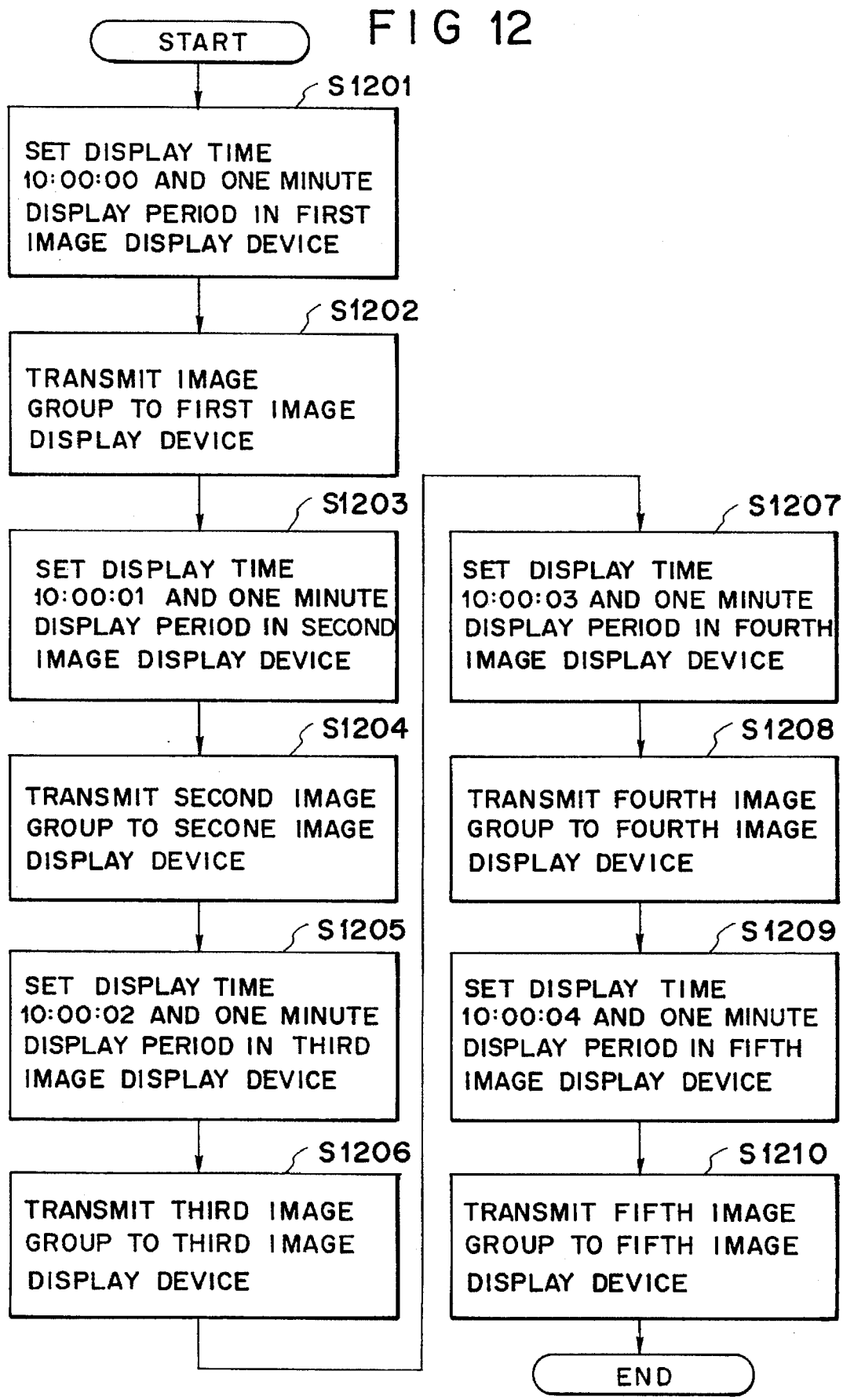
FIG. 12 shows a flow chart of a control sequence of a terminal to display by a plurality of display units.

When the polling command is received as shown in FIG. 11 (step S1101), the type of the polling command is checked (step S1102). If it is image polling, the transmitted data indicating the page number is read (step S1103), the image data of the corresponding page is read from the DRAM 108 (step S1104) and it is transmitted (step S1105). If the polling command is status polling, the status data is read from the RAM 104 (step S1106) and it is transmitted (step S1107).

A polling system in the facsimile protocol may be used as it is in the polling transmission/reception.

In this manner, the remote terminal transmits DTMF signals, various modem signals and the control command by using the facsimile protocol to control the display of the ID-FAX. In this case, the display image is controlled group by group and the image data in the group can be erased or replaced. The display time of the display group is controlled and the interruption display such as urgent message may be displayed with sound output. The clock IC 105 to synchronize the display time can be adjusted.

As an application of the above controls, an animation display may be done by a plurality of ID-FAX's.

An operation flow chart of the remote terminal when the animation display is conducted is shown in FIG. 12. A plurality of ID-FAX's 1301–1305 are installed in parallel as shown in FIG. 13. The ID-FAX's 1301–1305 of FIG. 13 display five pages of images, respectively.

Each ID-FAX sequentially displays the respective pages of images starting from a predetermined time.

According, if time lags are set among the display start times of the respective units and the identical or different image data are transmitted to those units for display, the entire image represented by the displays of the respective units can be scrolled left or right.

The display time of the display group of each unit may be controlled by the display time change command (FIG. 5).

In FIG. 12, time "10:00:00" is set as the display time of the image group to be transmitted to the first image display unit and "1 min" is set as the display time (display interval) (step S1201). The first image group (a plurality of images including the display image of the unit 1301 of FIG. 13) is transmitted to the first image display unit (step S1202).

Then, time "10:00:01" is set as the display time of the image group to be transmitted to the second image display unit, and "1 min" is set as the display interval (step S1203). The second image group (a plurality of images including the display image of the unit 1302 of FIG. 13) is transmitted to the second image display unit (step S1204).

Then, time "10:00:02" is set as the display time of the image group to be transmitted to the third image display unit, and "1 min" is set as the display interval (step S1205). The third image group (a plurality of images including the display image of the unit 1303 of FIG. 13) is transmitted to the third image display unit (step S1206).

Then, time "10:00:03" is set as the display time of the image group to be transmitted to the fourth image display unit, and "1 min" is set as the display interval (step S1207). The fourth image group (a plurality of images including the display image of the unit 1304 of FIG. 13) is transmitted to the fourth image display unit (step S1208).

Then, time "10:00:04" is set as the display time of the image group to be transmitted to the fifth image display unit and "1 min" is set as the display interval (step S1209). The fifth image group (a plurality of images including the display image of the unit 1305 of FIG. 13) is transmitted to the fifth image display unit (step S1210).

In this manner, the images are displayed from the left as shown in FIG. 13 at the one-second interval starting from the time "10:00:00" and the images are scrolled to the right at one-minute intervals so that the animation display is attained.

For example, the first image of the first image group, the second image of the second image group, the third image of the third image group, the fourth image of the fourth image group and the fifth image of the fifth image group are identical, and the second image of the first image group, the third image of the second image group and so on are identical.

In the multi-station transmission mode shown in FIG. 4, the image data is transmitted from the image data terminal 403 while the control commands such as display times to the respective image display units 401 are transmitted from the control terminal 402.

When both data have been transmitted, the multi-station transmission unit 404 simultaneously transmits the image to the respective image display units 401 (or transmits sequentially by imparting a margin to the display start time).

In the multi-station transmission system, the transmission paths for the image data and the control command can be separated and the control thereof is facilitated. Further, since the image data and the control commands can be transmitted at high speeds, a real-time display control is attained.

In the present embodiment, all settings are read to update the data in the RAM 104 in the time change process of FIG. 6. Alternatively, the time change command may be divided to a date change command, a display time change command, etc. so that only the data to be updated is transmitted from the control terminal. The same is applied to the time setting sub-routine of FIG. 8.

In this manner, the control command is detected in the signal format of the command by the DTMF signal or in accordance with the CCITT Recommendation T30, and a plurality of image data are stored. Because of those functions:

(1) The control commands such as display page, display group, display time, display date, display interval and display sequence can be remotely transmitted and there is no need for an operator to come to the place of the image display unit.

(2) Since the function to transmit the information relating to the operation status of the unit to the control terminal is provided, it is possible to transmit the current operation status of the image display unit to the remote terminal in response to the request command and transmit the stored image to the remote terminal in response to the request command. Accordingly, the operation status, the image stored in the memory and the image being displayed can be checked without requiring the operator to come to the place of the image display unit.

(3) The switching of a display can be informed by the sound generated when the display is switched and it is possible to attract more attention of observers. The sound volume may be remotely controlled without requiring the operator to come to the place of the image display unit.

(4) The image transmitted by the interruption command is displayed with a high priority so that any urgent message is displayed with the high priority.

(5) Any unnecessary image can be partially or totally erased from the remote place by the memory erase command so that the effective use of the memory is attained.

(6) The time of the timer in the image display unit may be set from the remote place by the time setting command without requiring the operator to come to the place of the image display unit.

(7) In the multi-station transmission mode, the program control signal is transmitted from the control terminal and the image information is transmitted from other multi-station transmission units so that the transmission time is reduced.

In the present embodiment, the display unit with the communication function is explained. The output of the image to be controlled is not limited to the display but similar control may be applied to record output.

A communication control process when a call is received by the MPU 101 of FIG. 2 is now explained in detail.

As described above, the display unit with the communication function of the present embodiment displays information such as images, characters or graphics to many non-specified people at the public place such as station, airport or event place. Where a plurality of display units with the communication functions are installed, they are synchronously controlled. In such an application, the content of display and the sequence of display of images are controlled from the remote terminal through the telephone line.

In such a case, the remote terminal is not limited to one type as it is in the prior art but various units such as a telephone set or a personal computer with a modem (or a like data terminal) may be used.

In the present embodiment, both the remote control by the control signal which uses the DTMF signal and the remote control by the V21 modem signal are supported. The present embodiment further supports the DTMF control by the hand set (telephone set) connected to the NCU 110.

Examples of transmission/reception (1)–(3) of the display control command response are explained in detail. The detail of the display control command is omitted here.

(1) Local Command

A push button of the hand set connected to the NCU 110 is depressed to enter the display control command. The interval between the DTMF's in each command is no longer than one minute, for example. If the interval is longer, the command is invalid. If the command is to be executed, the command is reentered from the beginning. When the user operates the local command, the user operation is given with a high priority even if a call from the telephone line is detected.

When the local command is entered, either an affirmative or negative response is sent back. The source of response can be distinguished by sound.

After the hand set is hooked off, "0" is entered to capture the line to enable the communication through the external line.

(2) Remote Command

The display control command enables the remote transmission from the remote place through the telephone line. This is for the assumption of no-man operation.

To enter the remote command, the ID-FAX (the display unit with communication function) is called by the telephone, a password is entered, and the push button is depressed within two seconds. If the entry of the remote command is not started within two seconds, the ID-FAX starts new reception or interruption reception. If the command is entered, the next command is to be entered within five minutes. If there is no entry within five minutes, the line is disconnected.

The command format by the DTMF signal is identical to the command format of the DTMF signal entered by the attached hand set (local command).

(3) Communication Command

A separate termianl for control such as a personal computer is connected from the remote place to the ID-FAX through the telephone line so that the user can control the ID-FAX flexibly without thinking of command.

The communication command controls the unit by a unique protocol which is different from the protocol of the CCITT Recommendation T30 by the interface which uses the V21 modem signal between the ID-FAX and the control personal computer. The protocol employs the hand shaking process in which the ID-FAX sends back a response to the command transmitted from the terminal. It responds by a predetermined response to a predetermined command.

Figure 15:
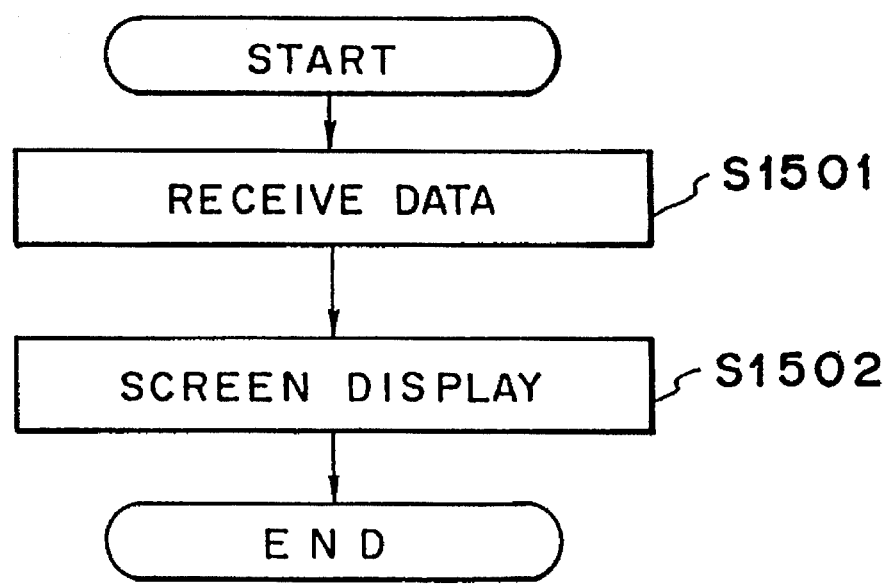
FIG. 15 shows a flow chart of a display control sequence of a prior art apparatus.

FIG. 15 shows a flow chart of an initial discrimination sequence when the call is received. In the present call reception control, the display control by the DTMF signal and the V21 modem signal in (2) and (3) above is discriminated to accept either of them.

In the following description, the discrimination of the password which is first entered in the communication for the display control (the ID information indicating whether the calling party has a right to access) is explained.

The operator at the remote place transmits the predetermined password in the first phase of the communication by the remote operation by using the DTMF signal (output from the telephone set or the facsimile device) or the V21 modem signal (output from the terminal such as personal computer with modem).

Figure 14:
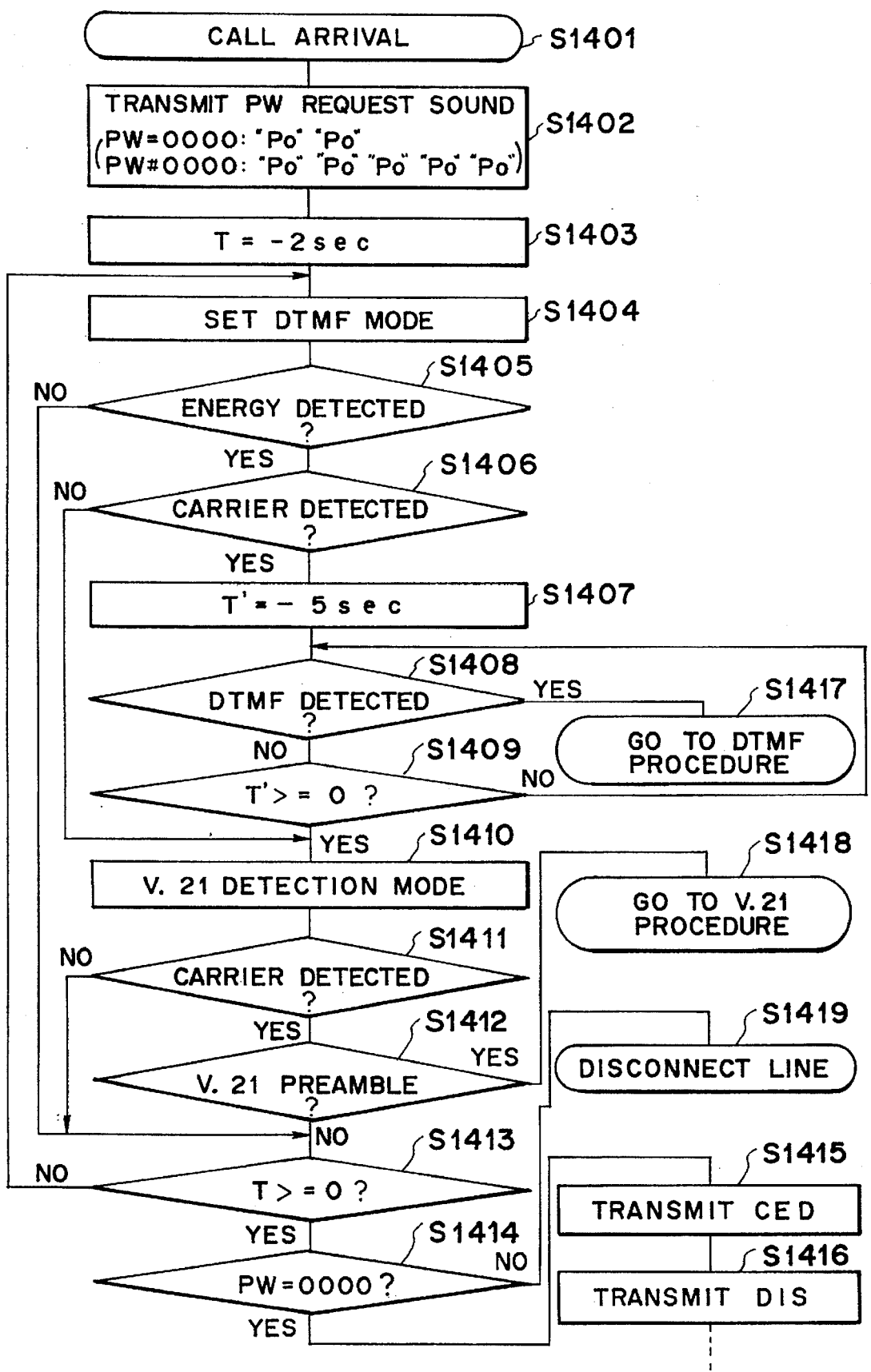
FIG. 14 shows a flow chart of a received call control sequence of the display unit.

In a step S1401 of FIG. 14, the MPU 101 checks the output of the NCU 110. If it detects the call from the telephone line, it sends PW (password) request sound in a step S1401. Assuming that the destination station is a telephone set, the request sound is an audio sound signal of a predetermined tone or ringing pattern, or a predetermined frequency.

In a step S1403, a predetermined discrimination time (T=–2 seconds) is set to the timer T.

In step S1404–1409 and S1410–S1412, significant signal by the DTMF signal or the V21 modem signal is detected.

In the step S1404, the DTMF mode is set. In the step S1405, the energy of the received signal is detected. If the signal energy is not detected in the step S1405, the process proceeds to the step S1413, and if the signal energy is detected, the process proceeds to the step S1406 to detect a carrier.

If the carrier is not detected, the process proceeds to the step S1410, and if the carrier is detected, the process proceeds to the step S1407 where a predetermined carrier discrimination time (for example, T'=–5 seconds) is set to another timer T'.

In the step S1408, the DTMF is detected by the DTMF receiver 111. If the DTMF signal is detected, the process proceeds to the DTMF sequence (step S1417) to analyze and collate the password transmitted by the DTMF.

On the other hand, if the DTMF signal is not detected in the step S1408, the MPU 101 check if the timer T'≧0

(DTMF discrimination time) in the step S1409. If the DTMF signal discrimination time is over, the process proceeds to the step S1410 to detect the V21 signal.

In the step S1410, the V21 signal detection mode is set. In the step S1411, the carrier is detected. If the carrier is not detected in the step S1411, the process proceeds to the step S1413, and if the carrier is detected, the process proceeds to the step S1412 where the preamble of the V21 modem signal is detected by the modem 109. If the preamble of the V21 modem signal is detected, the process proceeds to the V21 sequence of the step S1418 to analyze and collate the password transmitted by the V21 modem signal.

If the preamble of the V21 modem signal is not detected in the step S1412, the process proceeds to the step S1413 to check the time-out of the timer for the overall discrimination time set in the step S1403. If it is not timed out, the steps after the step S1404 are repeated. If it is timed out, the process proceeds to the step S1414.

In the step S1414, S1417 and S1418, the password is analyzed and collated, and the result is determined in the step S1414. If the password matches (PW=0000) in the step S1414, the CED is transmitted (S1416) and the DIS is transmitted to communicate the command response. If the password mismatches, the process proceeds to the step S1419 to disconnect the line.

In the present embodiment, both the DTMF signal and the V21 modem signal are assumed as the control protocol signal and either signal can be accepted. Alternatively, the DIP switch connected to the NCU 110 or other keyboard may be set to accept only one of them.

In this case, a simple operation may be done through the hand set and a complex operation may be done through the personal computer. The entry from the hand set may be preset so that it cannot be altered without authorization.

In the present embodiment, when the display of the ID unit 117 is to be controlled, it may be remotely controlled from the distant place by using the DTMF or V21 modem signal.

The command/response communication is done by the DTMF signal or the V21 modem signal and various display controls (to be described later) are attained. Simple controls may be done through the telephone set and the complex controls may be done through the personal computer. Where the affect by echo is involved such as in the oversea line, the control by the V21 modem signal may be used to attain better communication and display control.

The command may be transmitted by the protocol using the V21 signal from a host such as a personal computer. Accordingly, the ID-FAX may transmit to the host the status of image/command held in the ID-FAX, the communication control report, parameters and status. Command responses to execute such operation may be preset to facilitate the implementation.

In this manner, the host such as a personal computer get the status of the ID-FAX's which it controls in the form of processable data and the maintenance of ID-FAX's is attained without sending servicemen to the sites.

The display control program of the MPU 101 for the display control may be developed not only in the ROM 106 but also in the RAM 104. Not only the display data but also the display control program itself may be transmitted through the line for use by the ID-FAX. In this case, the command response to change the dispaly control sequence or dump or update the data or program in the RAM may be prepared so that the control program of the MPU 101 is updated or patched from the remote place.

In the present embodiment, the following various applications are attained by using the command response communication by the DTMF or the V21 modem.

For example, a command may be issued from the personal computer to display on the ID unit 117 a desired one of the images which the ID-FAX previously received, at a desired time.

For example, when a display program (which does not mean only the display control program of the MPU 101, but namely comprises display data and/or control program therefor) is transferred to the ID-FAX to control the display in accordance with the display program, a plurality of display programs related with the display start time data (or display switching time interval data) of a predetermined format) are transferred through the telephone line and stored. The display programs are switched in accordance with the clock of the ROM 106.

In this manner, a series of notices comprising several pages may be repeatedly displayed, and another notice may be displayed in the afternoon.

Normal display programs are automatically switched as described above, and the urgent program may be displayed by interrupting the normal display by sending the predetermined control command (and the display program for urgent display if required).

The unnecessary image in the ID-FAX may be partially or totally erased by transmitting the control command from the remote place. Accordingly, the memory expansion of the limited memory capacity is not necessary and the ID-FAX can be operated in the shortest communication time in accordance with the desired display scheme.

In the present embodiment, the ID-FAX is used although the system which uses the DTMF and V21 modem signals may be applied to the transmission/reception of the control command response to transfer the collected image data from the remote place to other units by the remote control of the facsimile device.

The present invention is not limited to the above embodiments but various modifications thereof may be made without departing from the scope of claims.

What is claimed is:

1. An image display control method for controlling an image display unit from a remote location through a predetermined line, with the image display unit having a first memory in which a plurality of images are stored, comprising the steps of:

receiving first data for designating an image to be displayed from among the plurality of images stored in the first memory in advance and second data designating a time to display the image designated by the first data through the predetermined line;

storing the received first data and second data in a second memory; and reading the image designated by the first data from the first memory when the time designated by the stored second data is reached and displaying the image on the image display unit.

2. An image display control method according to claim 1, wherein the display unit receives the image through the predetermined line and the received image is stored in the first memory.

3. An image display control method according to claim 1, wherein the predetermined line is a telephone line.

4. An image display control method according to claim 1, wherein the first data and the second data are received in the form of a DTMF signal or a V21 modem signal.

5. An image display control apparatus for causing an image display unit to display an image, comprising:

first memory means for storing a plurality of images;

input means for inputting control data to control the display of the image through a predetermined line, the control data including first data for designating the image to be displayed from among the plurality of images stored in said first memory in advance and second data designating a display time of the image designated by the first data;

second memory means for storing the first data and the second data input by said input means;

a timer for outputting time data; and control means for comparing the time designated by the second data stored in said second memory means with the time data output by said timer, and when matched, reading the image designated by the first data corresponding to the second data from said first memory means for causing said image display unit to display the read images.

6. An image display control apparatus according to claim 5, wherein said input means inputs image data and said second memory means stores the image data input by said input means.

7. An image display control apparatus according to claim 5, wherein said predetermined line is a telephone line.

8. An image display control apparatus according to claim 5, wherein said input means inputs the first data and the second data in the form of a DTMF signal or a V21 modem signal.

9. An image display control method for controlling an image display unit from a remote location through a predetermined line, the image display unit having a first memory in which a plurality of groups, each of which comprises images of a plurality of pages, are stored in advance, said method comprising the steps of:

receiving first data designating the group to be displayed from among the plurality of groups stored in the first memory in advance and second data designating an order of display of each page in the group designated by the first data through the predetermined line;

storing the order of display designated by the received second data in a second memory; and displaying images of the group designated by the first data according to the order of display stored by the second memory.

10. An image display control according to claim 9, wherein the display unit receives the image through the predetermined line and the received image is stored in the first memory.

11. An image display control method according to claim 9, wherein the predetermined line is a telephone line.

12. An image display control apparatus for causing an image display unit to display an image, comprising:

first memory means for storing a plurality of groups, each of which comprises images of a plurality of pages, in advance;

input means for inputting first data designating the groups to be displayed from among the plurality of groups stored in said first memory in advance and second data designating an order of display of each page in the group designated by the first data through a predetermined line;

second memory means for storing the order of display designated by the second data inputted by said input means; and control means for causing the image display unit to display the images of the group designated by the first data according to the order of display stored by said second memory means.

13. An image display control apparatus according to claim 12, wherein said input means inputs image data and said second memory means stores the image inputted by said input means.

14. An image display control apparatus according to claim 12, wherein said predetermined line is a telephone line.

15. An image display control method for controlling an image display unit from a remote location through a predetermined line, the image display unit having a first memory in which a plurality of groups comprising images of a plurality of pages are stored and a second memory in which an order of displaying the images of each page in each group stored in the first memory are stored, said method comprising the steps of:

receiving first data designating a group to be displayed and second data designating an order of displaying the image of each page in the group designated by the first data through the predetermined line; and changing the order of display of the image of each page in the group to another order of display in accordance with the second data.

16. An image display control method according to claim 15, wherein the display unit receives the image through the predetermined line and the received image is stored in the first memory.

17. An image display control method according to claim 15, wherein the predetermined line is a telephone line.

18. An image display control apparatus for causing an image display unit to display an image, comprising:

first memory means in which a plurality of groups comprising images of a plurality of pages have been stored;

second memory means in which an order of displaying the images of each page in each group stored in the first memory have been stored;

input means for inputting first data designating a group to be displayed and second data designating an order of display of images of each page in the group designated by the first data through a predetermined line; and changing means for changing the order of display of the image of each page in the group to another order of display in accordance with the second data.

19. An image display control apparatus according to claim 18, wherein said input means inputs image data and said first memory means stores the image input by said input means.

20. An image display control apparatus according to claim 18, wherein said predetermined line is a telephone line.

21. An image display control method for controlling an image display unit from a remote location through a predetermined line, with the image display unit having a memory in which a plurality of images are stored, said method comprising the steps of:

reading the image stored in the memory and displaying the image on the image display unit;

discriminating whether or not a command for an interruption display of an image is received through the predetermined line when the image is being displayed on the image display unit;

receiving an image for the interruption display through the predetermined line when the command for interruption display is received;

erasing the image currently being displayed;

displaying the image for interruption display instead of the image which is being displayed on the image display unit; and displaying the image displayed before the image for interruption display instead of the image for interruption display when a predetermined time for displaying the image for interruption display is reached.

22. An image display control method according to claim 21, wherein data indicating a display time for the image for interruption display is received in the receiving step.

23. An image display control method according to claim 21, wherein the predetermined line is a telephone line.

24. An image display control method according to claim 1, wherein the image display unit forms an image on a recording medium and the formed image is displayed by a display window.

25. An image display control apparatus according to claim 5, wherein the image display unit forms an image on a recording medium and the formed image is displayed by a display window.

26. An image display method apparatus according to claim 9, wherein the image display unit forms an image on a recording medium and the formed image is displayed by a display window.

27. An image display control apparatus according to claim 12, wherein the image display unit forms an image on a recording medium and the formed image is displayed by a display window.

28. An image display control method according to claim 15, wherein the image display unit forms an image on a recording medium and the formed image is displayed by a display window.

29. An image display control apparatus according to claim 18, wherein the image display unit forms an image on a recording medium and the formed image is displayed by a display window.

30. An image display control method according to claim 21, wherein the image display unit forms an image on a recording medium and the formed image is displayed by a display window.

* * * * *

UNITED STATES PATENT AND TRADEMARK OFFICE
CERTIFICATE OF CORRECTION

PATENT NO. : 5,644,407
DATED : July 1, 1997
INVENTOR(S) : Watanabe et al.

It is certified that error appears in the above-identified patent and that said Letters Patent is hereby corrected as shown below:

On title page, item
[56] REFERENCES CITED:

FOREIGN PATENT DOCUMENTS, "292976" should read --272976--.

COLUMN 13:

Line 43, "control" should read --control method--.

Signed and Sealed this

Twenty-first Day of April, 1998

Attest:

BRUCE LEHMAN

*Attesting Officer*      *Commissioner of Patents and Trademarks*